Nov. 27, 1951     D. S. WOOD     2,576,433
RAPID LOAD TESTING MACHINE

Filed Feb. 16, 1949     2 SHEETS—SHEET 1

INVENTOR.
DAVID S. WOOD
BY *Wade Koontz* AND
*Frederick W. Cotterman*
ATTORNEYS

Nov. 27, 1951  D. S. WOOD  2,576,433
RAPID LOAD TESTING MACHINE
Filed Feb. 16, 1949  2 SHEETS—SHEET 2

INVENTOR.
DAVID S. WOOD
BY Wade Keenty AND
Frederick W. Cotterman
ATTORNEY

Patented Nov. 27, 1951

2,576,433

UNITED STATES PATENT OFFICE 2,576,433

RAPID LOAD TESTING MACHINE

David S. Wood, Sierra Madre, Calif., assignor to the United States of America as represented by the Secretary of the Air Force Application February 16, 1949, Serial No. 76,766

6 Claims. (Cl. 73—90)

This invention relates to a load testing machine and is particularly adapted for applying a predetermined and controlled tensile load at a desired rate to a test specimen.

In the operation of conventional hydraulic tensile testing machines the rate at which load is applied to the test specimen can only be controlled by continuous manual adjustment of the machine. It is therefore an object of this invention to provide a machine of this general class with means whereby the period of time within which the desired load is accepted by the specimen may be predetermined and automatically controlled to the end that the loading of materials as occur in actual use may be more closely simulated.

It is particularly an object of this invention to provide a means of applying a load within a period of time which is much shorter than the length of time required to apply a load in a conventional testing machine.

Another object is to provide a tensile load testing machine in which a greater number of specimens may be tested in a given time than is usual in common practice.

Other objects and advantages may be discovered by inspection of the following description and drawings, wherein.

Like reference characters refer to like parts throughout the several views.

Figure 1:
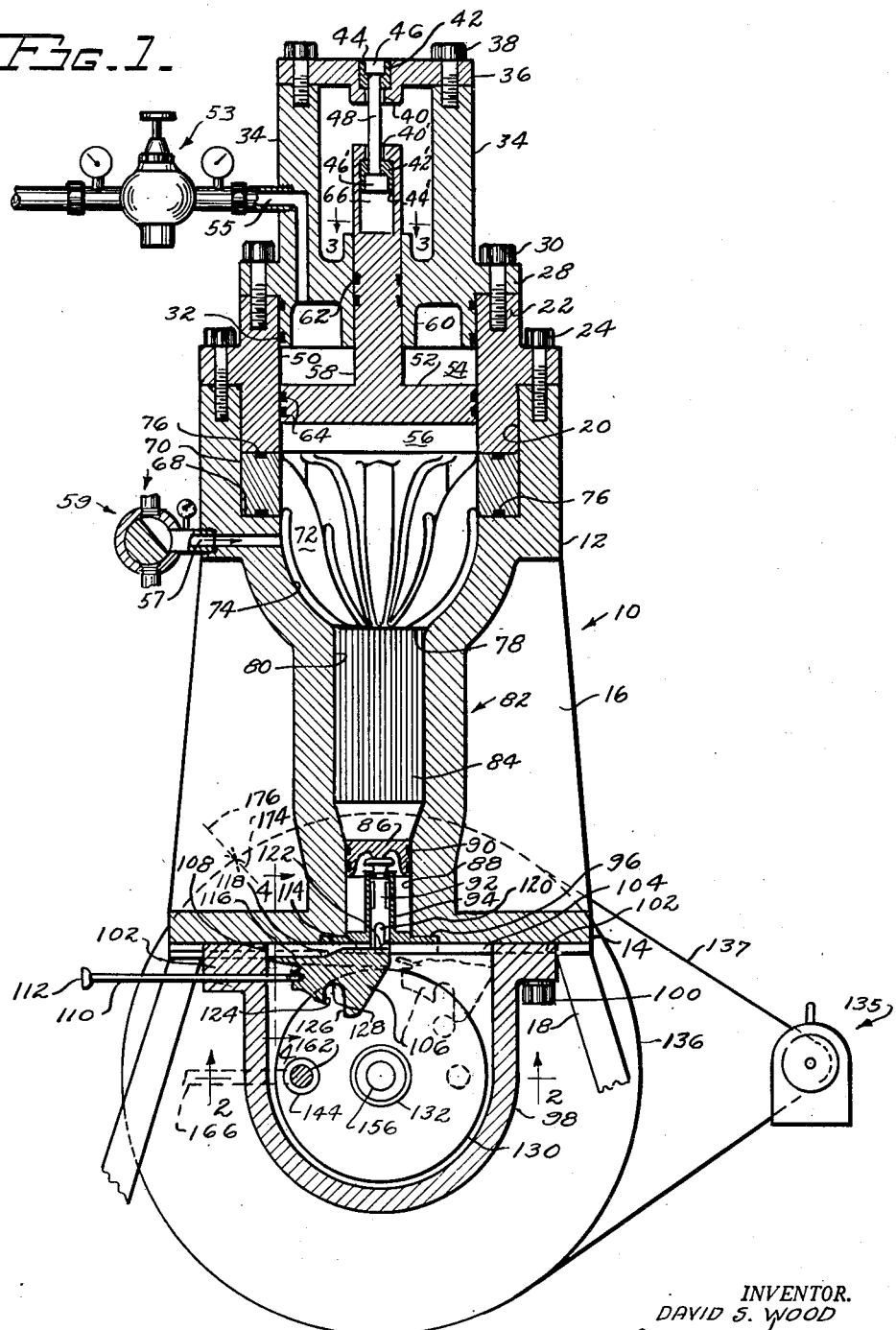
Fig. 1 is a longitudinal vertical axial section through my improved tensile load testing machine.

Referring more particularly to Fig. 1, the main frame 10 of the machine consists of a cylindrical portion 12 with integral base 14 and ribs 16, the base 14 being provided with supporting legs 18 integral therewith or attached thereto in any suitable manner.

At its upper end the frame 10 is bored at 20 to receive a large flanged cylinder 22 which is secured in the frame by screws 24.

At its upper end the cylinder 22 is closed by a flanged cylinder head 28 which is secured to the cylinder 22 by screws 30. Seal rings 32 are provided to prevent leakage between the cylinder and head.

Extending upwardly from the top of the flanged cylinder head 28 is a pair of pillars 34 with a cross beam 36 held to the top of the pillars by screws 38. The cross beam 36 is centrally bored at 40 and counterbored at 42 to receive a split bushing 44 whereby the enlarged end 46 of a test specimen 48 is held for application of load. A threaded bushing incorporating a spherical seat and a matching spherical seat in the cross beam 36 could also be used.

Slidable in the bore 50 of the cylinder 22 is a large piston 52 which divides the space inside the frame 10 and cylinder 22 into an upper chamber 54 and lower chamber 56. Pipes 55 and 57 communicate respectively with chambers 54 and 56 whereby an expansible fluid may be brought into the chamber 54 and a noncompressible fluid into the chamber 56. A conventional pressure regulating unit 53 is provided whereby, when the piston 52 descends slightly during the operation of taking a test, the pressure in chamber 54 will remain uniform throughout the test. A conventional two-way valve 59 is provided for controlling the amount of noncompressible fluid in chamber 56. A piston rod 58 extends upwardly from the piston 52 and has sliding bearing in a hub 60 of the cylinder head 28. Seal rings 62 prevent leakage between the piston rod 58 and the hub 60, seal rings 64 being provided for the piston 52.

At its upper end the piston rod 58 is bored as at 40' and counterbored as at 42' to receive a split bushing 44' whereby the enlarged end 46' of a test specimen 48 is held for application of load. Split bushings 44 and 44' are alike although 44' is inverted with respect to 44. A threaded bushing incorporating a spherical seat could also be used in place of 44'.

Figure 3:
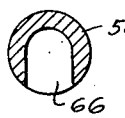
Fig. 3 is a section taken at 3—3 of Fig. 1 through the piston rod.
Figure 4:
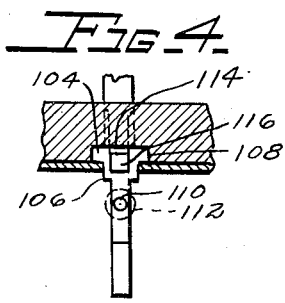
Fig. 4 is a section taken at 4—4 of Fig. 1 showing the cam mechanism for controlling the rate of application of the load.

Below the lower edge of the bushing 44' the opening 66 is shaped as in Fig. 3 in order that the split bushing 44' may be gotten around the enlarged end 46' of the test specimen 48 when a specimen is being inserted.

Concentrically held between the lower end of the flanged cylinder 22 and a shoulder 68 in the frame part 12 of the frame 10 is a ring 70 which supports a series of circumferentially spaced depending ribs 72 which converge at the lower end at points near the axis of the frame. The inside of the frame part 12 which contains the ribs 72 is bowl-shaped as at 74 and the ribs 72 are externally shaped to conform to the bowl. Seal rings 76 are provided in the edges of the ring 70.

Concentrically disposed and extending from the bottom 78 of the bowl 74 downward is a cylindrical opening 80 which houses a damping cell 82 composed of a multiplicity of small tubes 84 fastened by any suitable means against movement therein.

A relatively small piston 86 is slidable in a cylinder bore 88 near the bottom of the frame part 12. Seal rings 90 prevent leakage past the piston. A small plunger 92 is slidable in a tubular member 94 which is maintained coaxial with the piston 86 by the plate 96 which is recessed in the base 14 and fastened with screws or like means (not shown).

A cam housing 98 is attached to the underside of the base 14 by screws 100, a T-shaped tongue 102 on the top of the housing fitting into a T-shaped groove 104 in the bottom of the base 14. A cam 106 is also provided with a T-shaped tongue 108 in its upper edge which slidably fits the T-shaped groove 104 in the bottom of the base 12, the groove being also carried through the bottom of the plate 96, whereby the cam 106 may slide from its position in the left hand side (see Fig. 1) of the housing 98, where the cam is shown in section, to the right hand side, where the cam is shown in phantom. A rod 110 with knob 112 is slidable in an opening in the wall of the housing 98 and has its inner end fixed in the cam, whereby the cam may be moved back manually to its normal position as shown in section in Fig. 1.

In the top edge of the cam 106 a plunger operating groove is formed, the right-hand half 114 of the groove being relatively shallow and the left-hand half 116 being deeper, the two parts of the groove being joined together by a sloping portion 118. The round plunger 92 is flattened on the sides as at 120 to fit the groove 114, 116 freely, the heel 122 of the plunger 92 being sloped to correspond to the slope 118 of the groove. The underside of the cam 106 has two depending portions 124 and 126 joined by a semicircle 128 the center of which is on a vertical line which bisects the sloping portion 118 of the cam groove. The purpose of this construction will be apparent when coacting structure is hereinafter described.

The cam operating drum 130 is rotatable by a shaft 132 which has bearing in a hub 134 of the cam housing 98. A pulley 136 is fast on the shaft 132 and is adapted to be driven through a variable speed motor 135 and a V belt 137 or other suitable means.

A coaxial opening 138 and an axially parallel opening 140 are provided in the drum 130 for respectively receiving the plungers 142 and 144 slidably. A light spring 146 and a relatively heavy spring 148 respectively urge the plungers 142 and 144 toward the outer end of the drum. Both plungers 142 and 144 are annularly grooved as at 150 and 152, the sides of the grooves being beveled. A bevel ended locking plug 154 is slidable in a radial opening in the drum 130, the axes of the plungers 142 and 144 and that of the locking plug 154 being all in the same plane. The locking plug 154 is of such length that when one end of the plug is at the bottom of one of the annular grooves, the other end of the plug is even with the top of the other annular groove.

Plunger 142 has a push button end 156 extending through the front cover 158 of the cam housing 98, the push button portion being smaller than the plunger proper whereby the shoulder 160 thereby formed on the plunger 142 limits axial movement of the plunger by the spring 146. The other plunger 144 is reduced in diameter at its forward end as at 162, the reduced portion being of such length that when the plunger 144 is in the retracted state shown in Fig. 2, the forward end of the plunger just clears the cam 106.

Means for returning the plunger 144 to the retracted state comprises a small push rod 164 radially equidistant with the plunger 144 from the axis of the drum 130 and a lever 166 hinged at 168 for forcing the push rod inwardly. A light spring 170 held in place by a cross pin 172 is provided for returning the push rod to its home position. As a means for aligning the plunger 144 with the push rod 164 when it is desired to return the plunger 144 to the retracted position an arrow 174 on the pulley 136 may be aligned with an appropriately placed arrow 176 on the frame part 16.

The operation of the equipment herein shown and described may preferably be substantially as follows:

By operating the two-way valve in the pipe 57 the large piston 52 may be raised to its upper limit. In this position a split bushing 44 may be placed around the upper head 46 of a test specimen 48 and the test specimen lowered through the opening 40 of the cross beam and through the opening 40' of the piston rod 58. The lower head 46' of the specimen 48 will now be in the recess 66 (see Fig. 3) where the second split bushing 44' may be placed around it. By lowering the large piston 52 back to the position shown in Fig. 1, the specimen will be in proper position as shown for taking the test.

Figure 2:
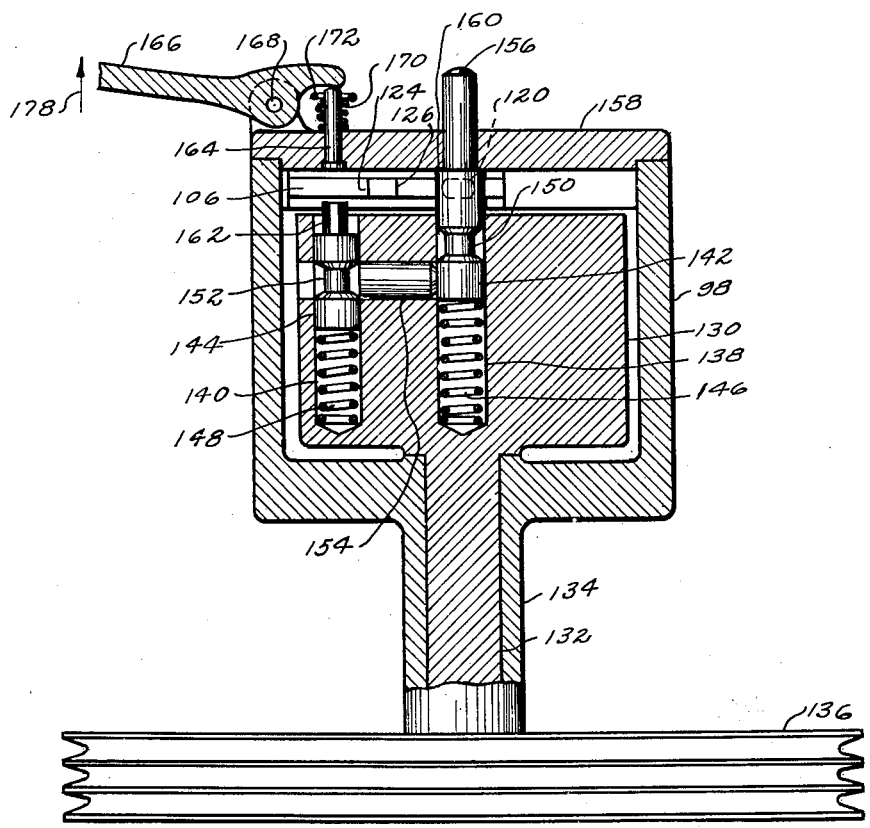
Fig. 2 is an axially-transverse section taken on the line 2—2 of Fig. 1.

If the cam 106 is not already in the position shown in section in Fig. 1, it may be brought to this position by pulling out the rod 110, and if the plunger 144 is not already in the retracted position shown in Fig. 2, it may be returned to the retracted position by aligning the arrows 174 and 176 then pulling the lever 166 in the direction of the arrow 178.

Compressed air or other expansible fluid is now let into the upper chamber through the pipe 55, the noncompressible fluid in the lower chamber 56, which may be a viscous fluid such as glycerin, being increased simultaneously in order to maintain substantially zero tension in the specimen 48.

The power source which rotates the pulley 136 is started and brought to a selected speed and the push button 156 is depressed, whereupon the heavy spring 148 forces the locking plug 154 out of the groove 152 and into the groove 150 which holds the push button 156 in the pressed in position but permits the plunger 144 to move axially forward whereby, upon rotation, it will engage the cam surface 126 whereby the cam 106 will be moved to the position shown in phantom in the right side of the cam housing. When the cam has been so moved, the drum 130 may continue rotation without doing further work.

When the cam 106 in moving from left to right, has reached substantially the mid-point of its travel, the small plunger 92 rides off the high portion 114 of the cam down the incline 118 and on to the low portion 116. It is noted that just as the small plunger 92 is riding down the incline 118, the plunger 144 is substantially at top center and its driving end 162 is between the surfaces 124 and 126 whereby the downward force on the small plunger 92 may not cause the cam to overrun the plunger end 162 which is driving it.

When the small plunger 92 rides down the incline 118 the support for the lower piston 86 is removed. Since the expansible fluid is still exerting its pressure on the top of the large piston 52, the test specimen 48 is subjected to a sudden load, the extent of the load being determined by the pressure of the expansible fluid and the suddenness being controllable by varying the rotative speed of the drum 130 and/or the slope 118 of the cam. During the slight movement of the large piston 52, the pressure in the chamber 54 throughout the piston movement is maintained at the value to which the pressure regulating unit 53 is adjusted. The cell 82 reduces to a minimum any oscillations of the noncompressible fluid in chamber 56. Due to the damping effect overtravel or oscillations of the large piston 52 is eliminated.

After applying the test to one specimen, the machine is readied for the next by (1) substituting a new specimen for the tested one; (2) returning the cam 106 with the rod 110; (3) aligning the arrows 174 and 176; (4) operating the lever 166; (5) starting the motor 135 which rotates the pulley 136; and (6) pressing in the push rod 156.

Having shown and described one embodiment of my invention wherein the objects set forth are attained, I claim:

1. A testing machine for rapidly applying a predetermined load to a test specimen at a predetermined rate comprising a machine frame, means on said frame for removably securing one end of the test specimen thereto, a work cylinder having a first piston therein, a piston rod connected to the first piston and having its other end adapted to be removably secured to the test specimen, means connected to said cylinder to apply a predetermined fluid pressure to one side of said first piston, a second piston in said cylinder, the space in said cylinder between said pistons being filled with liquid, and a mechanism comprising means operative when in its home position to hold said second piston against movement whereby the liquid trapped between said pistons prevents movement of said first piston and application of load to the test specimen, and movable at a predetermined rate through a predetermined distance to cause movement of the second piston at a predetermined rate in a direction such that the predetermined fluid pressure causes movement and application of load to the first piston at a rate proportional to the rate of movement of the second piston.

2. The structure as claimed in claim 1, in which fluid flow restricting means are positioned in said work cylinder in the space between said first and second pistons to damp to movement of fluid therebetween and prevent oscillations of the load applied to said test specimen.

3. A machine for applying a predetermined tensile load to a test specimen in a controlled period of time, which comprises an elongated framework having a cylindrical opening therethrough, a cylinder head for closing one end of said opening, two spaced apart pistons slidable in said opening, the first near said cylinder head thereby forming a first chamber for an expansible fluid under pressure and the second near the other end of said cylindrical opening thereby forming a second chamber between said pistons for a noncompressible fluid, means to control the pressure of said expansible fluid, means to control the volume of said noncompressible fluid, means carried by said framework for holding one end of a tensile test specimen, means for joining the other end of said tensile test specimen to said first piston, a cam slidable transversely of the cylinder axis at the end of the cylindrical opening near said second piston, said cam having a high and a low surface connected by a slope from one surface to the other, means extending from said second piston to said cam normally supporting said piston on the high surface of said cam against the pressure in said first chamber and means for controlling the speed at which said extending means slides down said slope so that the pressure on said second piston is transferred down the slope from the high surface down to the low surface in a predetermined period of time.

4. Claim 3 wherein the said means for sliding said cam transversely comprises a rib depending from the underside of said sliding cam, said rib having a slot in the form of an inverted U intermediate its ends, a rotatable drum, a coaxial plunger having its forward end extending from said drum for engagement with said slot and an axially parallel drum plunger having its forward end adapted for engagement with said slot, both plungers having a bevel sided annular groove intermediate the ends, and both slidable in openings in said drum, a coil spring in back of each plunger urging said plungers forwardly out of their openings in said drum, a radially disposed plunger retaining plug having beveled ends for entry into said bevel sided annular grooves, the plug and plungers all having their axes in the same plane, the length of the plug being such that when one beveled end is all the way in one annular groove the other beveled end is all the way out of the other annular groove, push button means for pressing the coaxial plunger in until its annular groove aligns with said plug, and means including a lever for pressing said axially parallel drum plunger in until its annular groove aligns with said plug.

5. Claim 4 with a housing open at the front end surrounding said cam and drum, a lid for said housing, an axially parallel lid plunger slidable in an opening in said lid located the same distance from the axis of the drum as the axially parallel plunger in the drum, means to indicate when the axis of the axially parallel plunger in the lid and the axis of the axially parallel plunger in the drum are coincident, the said lever means being operative also to press said axially parallel lid plunger against said axially parallel drum plunger until the bevelled end of the radially disposed plunger retaining plug is in alignment with the annular groove in the axially parallel drum plunger.

6. In a tensile testing machine, a frame having a main cylindrical bore substantially closed at both ends but with a small bore emanating from each end, a piston rod slidable in one end bore, means on said frame for fastening one end of a test specimen, means on the outer end of said piston rod for fastening the other end of said test specimen, a main piston fast on the inner end of said piston rod and positioned to leave a gas pressure chamber between said main piston and the said one end bore, a relatively small piston in the other end bore thereby forming a liquid pressure chamber between said main piston and the said other end bore, means to control the pressure in said gas pressure chamber, means to control the volume of said liquid pressure chamber, and cam means movably mounted at the outer end of said relatively small piston for controlling the rate of outward movement of said relatively small piston.

DAVID S. WOOD.

REFERENCES CITED

The following references are of record in the file of this patent:

UNITED STATES PATENTS

| Number | Name | Date |
|---|---|---|
| 570,970 | Tomkins | Nov. 10, 1896 |
| 2,081,599 | Peters | May 25, 1937 |
| 2,191,282 | Lewis | Feb. 20, 1940 |
| 2,354,562 | Webb | July 25, 1944 |
| 2,386,989 | Summers | Oct. 16, 1945 |
| 2,474,235 | Dresser et al. | June 28, 1949 |